US012770246B2

(12) United States Patent
Li et al.

(10) Patent No.: US 12,770,246 B2
(45) Date of Patent: Oct. 20, 2026

(54) DEFECT DETECTING APPARATUS AND METHOD

(71) Applicants: HON HAI PRECISION INDUSTRY CO., LTD., New Taipei City (TW); Foxconn Technology Group Co., Ltd., Guangdong Province (CN)

(72) Inventors: Yung-Hui Li, New Taipei City (TW); Kai-Lin Yang, New Taipei City (TW); Yi-Rong Lin, New Taipei City (TW)

(73) Assignees: HON HAI PRECISION INDUSTRY CO., LTD., New Taipei City (TW); Foxconn Technology Group Co., Ltd., Guangdong Province (CN)

( * ) Notice: Subject to any disclaimer, the term of this patent is extended or adjusted under 35 U.S.C. 154(b) by 291 days.

(21) Appl. No.: 18/330,381

(22) Filed: Jun. 7, 2023

(65) Prior Publication Data

US 2023/0394651 A1 Dec. 7, 2023

(30) Foreign Application Priority Data

Jun. 7, 2022 (TW) .................................. 111121112

(51) Int. Cl.
*G06T 7/00* (2017.01)

(52) U.S. Cl.
CPC .... *G06T 7/001* (2013.01); *G06T 2207/20081* (2013.01); *G06T 2207/20084* (2013.01)

(58) Field of Classification Search
CPC ........... G06T 7/001; G06T 2207/20081; G06T 2007/20084
See application file for complete search history.

(56) References Cited

U.S. PATENT DOCUMENTS 11,210,775 B1 12/2021 Wu et al.
11,657,269 B2 * 5/2023 Che ......................... G06F 17/18 706/25
2019/0073568 A1 * 3/2019 He .......................... G06T 7/001
2020/0344449 A1 * 10/2020 Allen ................ G01N 21/8851
(Continued)

FOREIGN PATENT DOCUMENTS

CN 109584221 A * 4/2019 ........... G06T 7/0002
CN 110796595 A 2/2020
(Continued)

OTHER PUBLICATIONS

GANomaly: Semi-supervised Anomaly Detection via Adversarial Training, Samet Akcay Amir Atapour-Abarghouei, and Toby P. Breckon (Year: 2019).*
(Continued)

*Primary Examiner* — Ming Shui
(74) *Attorney, Agent, or Firm* — CKC & Partners Co., LLC

(57) ABSTRACT

A defect detecting apparatus and method are provided. The defect detecting apparatus receives an image to be tested. The defect detecting apparatus detects the image to be tested through a defect detecting model to generate an anomaly score corresponding to the image to be tested, and the defect detecting model is generated based on the training of a generative adversarial network and a plurality of normalized loss functions. The defect detecting apparatus compares the anomaly score with an anomaly score threshold to determine whether the image to be tested is a defective image.

18 Claims, 2 Drawing Sheets

(56) References Cited

U.S. PATENT DOCUMENTS

| | | | | |
|---|---|---|---|---|
| 2021/0049452 | A1* | 2/2021 | Fan ........................ | G06N 3/049 |
| 2022/0108434 | A1 | 4/2022 | Donahue et al. | |
| 2023/0004760 | A1* | 1/2023 | Mustikovela .......... | G06V 20/56 |

FOREIGN PATENT DOCUMENTS

| | | | |
|---|---|---|---|
| CN | 111260620 | A | 6/2020 |
| CN | 113920096 | A | 1/2022 |
| CN | 114187201 | A | 3/2022 |
| CN | 114220043 | A | 3/2022 |
| IN | 201917050452 | A | 6/2019 |
| KR | 20220073652 | A | 6/2022 |
| TW | 201734955 | A | 10/2017 |
| TW | 201945861 | A | 12/2019 |

OTHER PUBLICATIONS

Difference Detection Between Two Images for Image Monitoring, Long Feng, Peihua Qiu (Year: 2017).*
Normalized Loss Functions for Deep Learning with Noisy Labels, Xingjun Ma, Hanxun Huang, Yisen Wang, Simone Romano Sarah Erfani, James Bailey (Year: 2020).*

* cited by examiner

DEFECT DETECTING APPARATUS AND METHOD

CROSS-REFERENCE TO RELATED APPLICATION

This application claims priority to Taiwan Application Serial Number 111121112, filed Jun. 7, 2022, which is herein incorporated by reference in its entirety.

BACKGROUND

Field of Invention

The present invention relates to a defect detecting apparatus and method. More particularly, the present invention relates to a defect detecting apparatus and method for improving the accuracy of defect detecting based on a multi-stage adjustment mechanism.

Description of Related Art

In recent years, due to the rapid development of smart manufacturing, the introduction of deep learning technology into the field of automated optical inspection (AOI) has become one of the development goals. Furthermore, in some industrial manufacturing fields, it is necessary to face the problems of unknown types of defects and lack of defect samples for training, so that semi-supervised defect detection methods are widely used.

Specifically, the semi-supervised defect detection can be trained through a generative adversarial network architecture during training. Since only training samples with normal labels are required during training, it is not necessary to collect a large number of anomaly samples. Therefore, the semi-supervised defect detection is more widely used than the supervised defect detection.

However, in the prior art, the semi-supervised defect detection in some detection fields or detection targets (e.g., nuts in industrial components) has a low accuracy rate and a high false positive rate in practical applications, so it cannot be practically applied in the industrial manufacturing.

Accordingly, there is an urgent need for a technology that can improve the accuracy of defect detecting.

SUMMARY

An objective of the present disclosure is to provide a defect detecting apparatus. The defect detecting apparatus comprises a storage, a transceiver interface, and a processor. The processor is electrically connected to the storage and the transceiver interface. The storage is configured to store a defect detecting model. The processor receives an image to be tested from the transceiver interface. The processor detects the image to be tested through the defect detecting model to generate an anomaly score corresponding to the image to be tested, and the defect detecting model is generated based on the training of a generative adversarial network and a plurality of normalized loss functions. The processor compares the anomaly score with an anomaly score threshold to determine whether the image to be tested is a defective image.

Another objective of the present disclosure is to provide a defect detecting method, which is adapted for use in a an electronic apparatus. The defect detecting method comprises following steps: receiving an image to be tested; detecting the image to be tested through a defect detecting model to generate an anomaly score corresponding to the image to be tested, and the defect detecting model is generated based on the training of a generative adversarial network and a plurality of normalized loss functions; and comparing the anomaly score with an anomaly score threshold to determine whether the image to be tested is a defective image.

According to the above descriptions, the defect detecting technology (at least comprises the apparatus and the method) provided by the present disclosure detects the image to be tested to generate an anomaly score corresponding to the image to be tested through the defect detecting model trained by a generative adversarial network and a plurality of normalized loss functions. The defect detecting technology determines whether the image to be tested is a defective image by comparing the anomaly score with an anomaly score threshold. In addition, the defect detecting technology provided by the present disclosure improves the training speed and the stability of the defect detecting model through a multi-stage adjustment mechanism (e.g., adjusting the loss function, adjusting the calculation method of the anomaly score, converting the color space and normalizing some of the channels, etc.). Therefore, the defect detecting technology provided by the present disclosure can improve the accuracy of defect detecting, and solve the problem that the defect detection caused by the conventional technology cannot be actually used for some detecting targets due to the low accuracy and high false positive rate.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a defect detecting apparatus and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
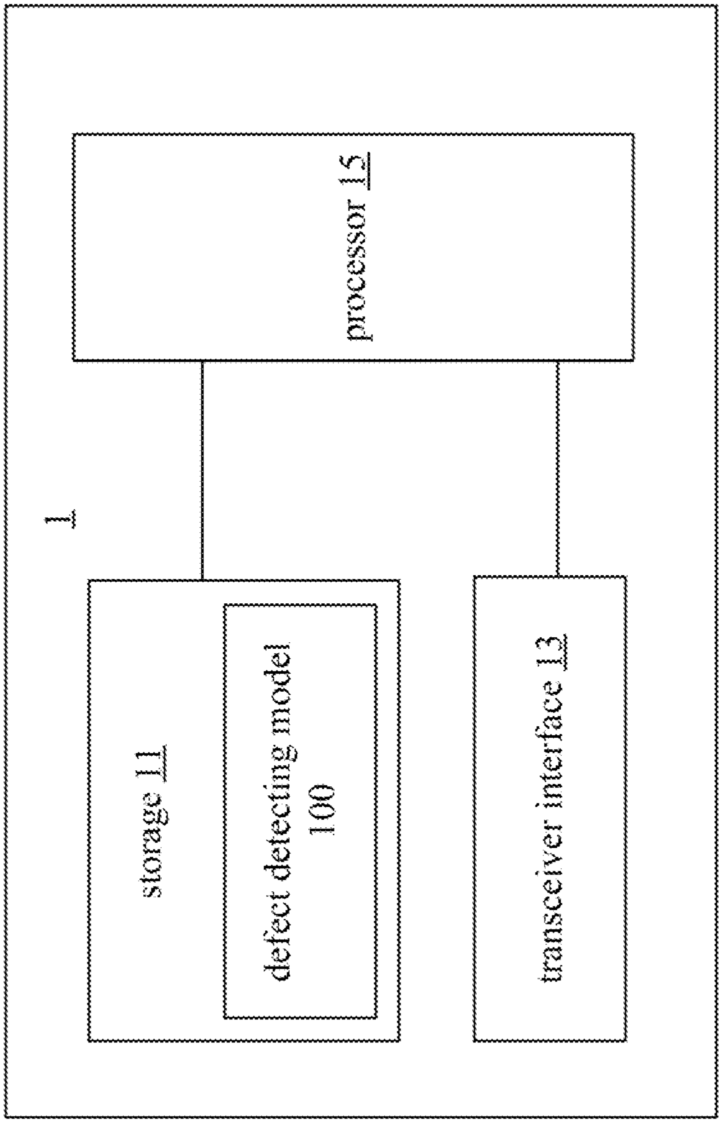
FIG. 1 is a schematic view depicting a defect detecting apparatus of the first embodiment.

A first embodiment of the present disclosure is a defect detecting apparatus 1 and a schematic view of which is depicted in FIG. 1. In the present embodiment, the defect detecting apparatus 1 comprises a storage 11, a transceiver interface 13, and a processor 15, and the processor 15 is electrically connected to the storage 11 and the transceiver interface 13.

It shall be appreciated that the storage 11 may be a memory, a Universal Serial Bus (USB) disk, a hard disk, a Compact Disk (CD), a mobile disk, or any other storage medium or circuit known to those of ordinary skill in the art and having the same functionality. The transceiver interface 13 is an interface capable of receiving and transmitting data or other interfaces capable of receiving and transmitting data and known to those of ordinary skill in the art. The transceiver interface 13 can receive data from sources such as external apparatuses, external web pages, external applications, and so on. The processor 15 may be any of various processors, Central Processing Units (CPUs), microprocessors, digital signal processors or other computing apparatuses known to those of ordinary skill in the art.

In the present embodiment, as shown in FIG. 1, the storage 11 is configured to store the defect detecting model 100. In the present disclosure, the defect detecting apparatus 1 may detect whether the image to be tested is a defective image through the defect detecting model 100, and the defect detecting apparatus 1 may improve the accuracy of defect detection through multiple stages of adjustment mechanisms (e.g., adjusting the loss function, adjusting the calculation method of the anomaly score, converting the color space and normalizing some of channels, etc.). The following paragraphs will specifically describe the content of the generation and implementation of the defect detecting model 100.

Specifically, the defect detecting model 100 is a trained defect detecting model, and the trained defect detecting model 100 can be used to detect whether the image to be tested is a defective image, and to generate an anomaly score corresponding to the image to be tested. It shall be appreciated that the defect detecting model 100 can be generated and trained by the defect detecting apparatus 1, or the defect detecting apparatus 1 can directly receive the trained defect detecting model 100 from an external apparatus as the defect detecting model 100 in FIG. 1 of the present application.

In some embodiments, the defect detecting apparatus 1 is trained based on a large number of sample images and an architecture of generative adversarial network (GAN) to generate the defect detecting model 100.

It shall be appreciated that the generative adversarial network is composed of a generator network and a discriminator network, and the adversarial training is performed in turn through the generator network and the discriminator network.

Taking the GANomaly network architecture as an example, the GANomaly network architecture comprises a generator network and a discriminator network. The generator network is sequentially composed of a first encoder, a decoder, and a second encoder, and the discriminator network is composed of a third encoder. The GANomaly network architecture performs adversarial training through the aforementioned generator network and the aforementioned discriminator network. In the present embodiment, the defect detecting apparatus 1 provided by the present disclosure can perform model training through the GANomaly network architecture.

Specifically, in the defect detecting apparatus 1 provided by the present disclosure, the processor 15 may receive a plurality of sample images though the transceiver interface 13, and the sample images comprise a plurality of normal images and a plurality of test images (e.g., defective images generated based on the generator network). Next, the sample images are input by the processor 15 to a training model constructed by the generative adversarial network. Then, the training model is trained by the processor 15 based on an encoder loss function, a contextual loss function, and an adversarial loss function after normalization. Finally, the training model after training is set as the defect detecting model 100 by the processor 15.

It shall be appreciated that since the input value range of the loss function used in the original GANomaly network architecture is very wide, it may cause difficulties and instability during training (e.g., the training results are divergent or biased towards certain channel values). In the present embodiment, the corresponding value range of the loss function can be normalized and constrained to be between [0, 1], thereby speeding up the training speed of the defect detecting model 100 and making it more stable.

In some embodiments, the encoder loss function after normalization is generated based on a normalized squared difference between a first encoding feature and a second encoding feature, and the first encoding feature is generated by a first encoder in the defect detecting model 100, and the second encoding feature is generated by a second encoder in the defect detecting model 100.

Specifically, the encoder loss function computes the squared difference of the latent vectors projected by the two encoders into the latent space. For example, the processor 15 may use the following equation to calculate the encoder loss function $L_{enc}$:

$$L_{enc} = \sum_{i=1}^{c*w*h}\left(\frac{z_i - \min(z_i)}{\max(z_i) - \min(z_i)} - \frac{\hat{z}_i - \min(\hat{z}_i)}{\max(\hat{z}_i) - \min(\hat{z}_i)}\right)^2$$

In the above equation, the parameter c represents the number of image channels, the parameter w represents the width of the image, the parameter h represents the height of the image, $z_i$ represents the first encoding feature generated by the first encoder, and $\hat{z}_i$ represents the second encoding feature generated by the second encoder. The max function and the min function output the maximum and minimum values output, respectively.

In some embodiments, the contextual loss function after normalization is generated based on a absolute value of a normalized pixel difference between the image to be tested and a reconstructed image corresponding to the image to be tested, and the reconstructed image corresponding to the image to be tested is generated by a first encoder and a decoder in the defect detecting model 100.

Specifically, the contextual loss function computes the absolute value of the difference between the entire reconstructed image and each pixel of the original image. For example, the processor 15 may use the following equation to calculate the contextual loss function $L_{con}$:

$$L_{con} = \sum_{i=1}^{c*w*h}\left|\frac{x_i - \min(x_i)}{\max(x_i) - \min(x_i)} - \frac{\hat{x}_i - \min(\hat{x}_i)}{\max(\hat{x}_i) - \min(\hat{x}_i)}\right|$$

In the above equation, the parameter c represents the number of image channels, the parameter w represents the width of the image, the parameter h represents the height of the image, $x_i$ represents the pixel value of the original image, and $\hat{x}_i$ represents the pixel value of the reconstructed image. The max function and the min function output the maximum and minimum values output, respectively.

In some embodiments, the adversarial loss function after normalization is generated based on a normalized feature matching squared difference.

Specifically, the adversarial loss function computes the squared difference of the output of the discriminator to measure the feature distance between the original image and the generated image (i.e., the reconstructed image) in the middle layer of the discriminator. For example, the processor 15 may use the following equation to calculate the adversarial loss function $L_{adv}$:

$$L_{adv}=\sum_{i=1}^{c*w*h}\left(\frac{f(x_i)-\min(f(x_i))}{\max(f(x_i))-\min(f(x_i))}-\frac{f(\hat{x}_i)-\min(f(\hat{x}_i))}{\max(f(\hat{x}_i))-\min(f(\hat{x}_i))}\right)^2$$

In the above equation, the parameter c represents the number of image channels, the parameter w represents the width of the image, the parameter h represents the height of the image, $x_i$ represents the pixel value of the original image, and $\hat{x}_i$ represents the pixel value of the reconstructed image. The output of the function f is the distance in the middle representation layer of the discriminator. The max function and the min function output the maximum and minimum values output, respectively.

It shall be appreciated that in the present embodiment, the processor 15 performs the loss calculation through the normalized loss functions. Since the adjusted loss function may make the value ranges of the three loss functions fall within a relatively close range, all sub-networks can be trained more evenly without biasing some values with higher weights.

In some implementations, the processor 15 may generate the objective function by adjusting the weights corresponding to each of the loss functions. For example, the processor 15 may use the following equation to generate the objective function:

$$L_{Loss}=w_{enc}L_{enc}+w_{con}L_{con}+w_{adv}L_{adv}$$

In the above equation, the parameters $w_{enc}$, $w_{con}$, and $w_{adv}$ are the weights of the hyperparameters. For example, the parameters $w_{enc}$, $w_{con}$, and $w_{adv}$ can be evenly set to 1, respectively, to train the three loss functions on average. It shall be appreciated that those of ordinary skill in the art shall appreciate the operation content of training through the generative adversarial network based on the foregoing descriptions. Therefore, the details will not be repeated herein.

In the present embodiment, the processor 15 receives an image to be tested from the transceiver interface 13. Next, the processor 15 generates an anomaly score corresponding to the image to be tested through the defect detecting model 100, and the defect detecting model 100 is generated based on the training of a generative adversarial network and a plurality of normalized loss functions. Finally, the processor 15 compares the anomaly score with an anomaly score threshold to determine whether the image to be tested is a defective image.

In some embodiments, in order to maintain the most complete and original amount of information for the estimation of the anomaly score, the calculation of the anomaly score is performed by the processor 15 calculating the average of the pixel squared differences between the original image and the generated image (i.e., the reconstructed image). Specifically, the processor 15 calculates a pixel squared difference between the image to be tested and a reconstructed image corresponding to the image to be tested to generate the anomaly score, and the reconstructed image corresponding to the image to be tested is generated by a first encoder and a decoder in the defect detecting model 100.

For example, the processor 15 may use the following equation to calculate the anomaly score A(X):

$$A(X)=\sum_{i,j,k=0}^{c,h,w}\frac{(x_{i,j,k}-G(x_{i,j,k}))^2}{c\times h\times w}$$

In the above equation, the parameter c represents the number of image channels, the parameter w represents the width of the image, the parameter h represents the height of the image, $x_i$ represents the pixel value of the original image, and $\hat{x}_i$ represents the pixel value of the reconstructed image. The function G outputs the pixel values of the reconstructed image (i.e., output via the first encoder and the decoder).

It shall be appreciated that the anomaly score threshold is a standard used to determine whether the image to be tested is a defective image. For example, when the processor 15 determines that the anomaly score corresponding to the image to be tested is greater than the anomaly score threshold, the image to be tested is a defective image. When the processor 15 determines that the anomaly score corresponding to the image to be tested is less than or equal to the anomaly score threshold, the image to be tested is a normal image.

It shall be appreciated that, for different detecting objects, the defect detecting apparatus 1 can set a suitable anomaly score threshold, and the anomaly score threshold can be adjusted through the results generated by the defect detecting apparatus 1 or experience.

In addition, due to the large difference between the channel value ranges of some color spaces, the model may be unstable during training (e.g., the training results are biased towards channel values with larger values). Therefore, in some embodiments, the processor 15 further performs color space conversion on the sample images during the training phase and performs a normalization operation on the channel values with larger values, so as to reduce the degree of influence of certain channel values on the model during the training phase.

Specifically, the processor 15 receives a plurality of sample images, and the sample images correspond to a first color space. Next, the processor 15 converts the sample images to a second color space, and the second color space comprises at least one first channel value and a plurality of second channel values. Then, the processor 15 performs a normalization operation on the at least one first channel value of the sample images in the second color space. Next, the processor 15 inputs the sample images to a training model constructed by the generative adversarial network, and trains the training model based on an encoder loss function, a contextual loss function, and an adversarial loss function after normalization. Finally, the processor 15 sets the training model after training as the defect detecting model 100.

In some embodiments, a first range corresponding to the at least one first channel value is different from a second range corresponding to the second channel values.

For ease of understanding, the nut image in industrial manufacturing is used as the target of defect detecting for illustration. In the present example, the processor 15 receives a plurality of sample images related to the nut. First, the processor 15 can convert the sample images originally corresponding to the RGB color space (i.e., comprising three channels of red, green, and blue) to the sample images represented by the CIELAB color space (i.e., comprising three channels of L, a, and b).

It shall be appreciated that since the nut images have a higher black and white color, the value of the 'L' channel in the CIELAB representation may be significantly higher than the value of the 'a' channel or the 'b' channel (e.g., the 'L' channel value may correspond to the value range of 10 to 80, and the 'a' channel or the 'b' channel may only correspond to the value range of −2 to 5).

Therefore, in order to avoid excessive influence of the 'L' channel value on model training, the processor 15 may normalize the 'L' channel value in the sample image. The processor 15 may divide the channel value corresponding to the 'L' channel in the sample images by the maximum value (i.e., the largest value among the 'L' channel values), so that the value ranges of the 'L' channel values in the sample images are all between [0, 1]. Finally, the processor 15 may train a defect detecting model based on the adjusted sample images.

In some embodiments, the processor 15 also performs the color space conversion and the normalization operation on the image to be tested. Specifically, the image to be tested corresponds to a first color space, and the processor 15 converts the image to be tested to a second color space, and the second color space comprises at least one first channel value and a plurality of second color values. Next, the processor 15 performs a normalization operation on the at least one first channel value of the image to be tested in the second color space. In some embodiments, a first range corresponding to the at least one first channel value is different from a second range corresponding to the second channel values.

According to the above descriptions, the defect detecting apparatus 1 provided by the present disclosure detects the image to be tested to generate an anomaly score corresponding to the image to be tested through the defect detecting model trained by a generative adversarial network and a plurality of normalized loss functions. The defect detecting apparatus 1 determines whether the image to be tested is a defective image by comparing the anomaly score with an anomaly score threshold. In addition, the defect detecting technology provided by the present disclosure improves the training speed and the stability of the defect detecting model through a multi-stage adjustment mechanism (e.g., adjusting the loss function, adjusting the calculation method of the anomaly score, converting the color space and normalizing some of the channels, etc.). Therefore, the defect detecting apparatus 1 provided by the present disclosure can improve the accuracy of defect detecting, and solve the problem that the defect detection caused by the conventional technology cannot be actually used for some detecting targets due to the low accuracy and high false positive rate.

Figure 2:
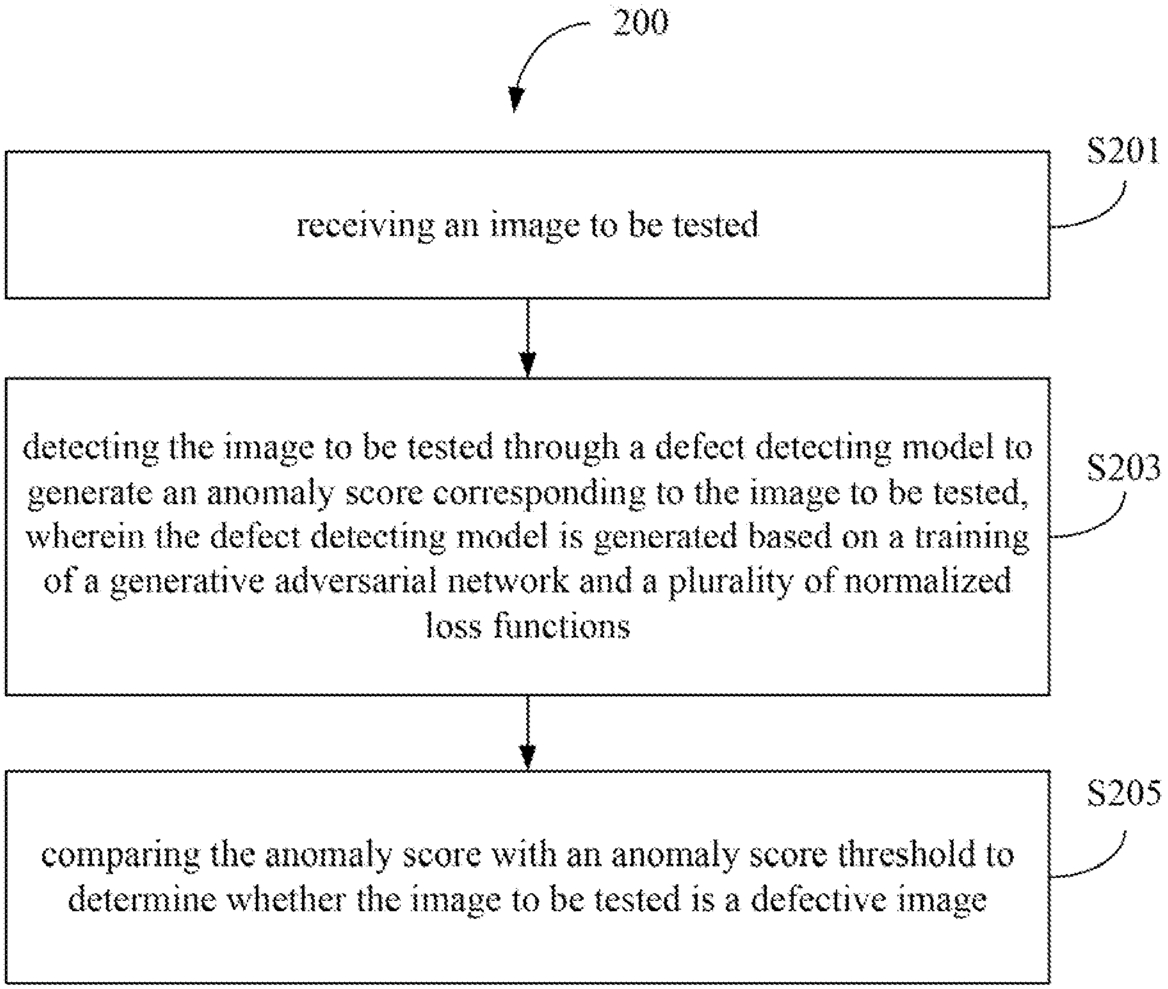
FIG. 2 is a partial flowchart depicting a defect detecting method of the second embodiment.

A second embodiment of the present invention is a defect detecting method and a flowchart thereof is depicted in FIG. 2. The defect detecting method 200 is adapted for use in an electronic apparatus. For example, the electronic apparatus may comprise a storage, a transceiver interface and a processor (e.g., the defect detecting apparatus 1 of the first embodiment). The electronic apparatus may store a defect detecting model (e.g., the a defect detecting model 100 of the first embodiment). The defect detecting method 200 determines whether the image to be tested is a defective image through the steps S201 to S205.

In the step S201, the electronic apparatus receives an image to be tested. Next, in the step S203, the electronic apparatus detects the image to be tested through a defect detecting model to generate an anomaly score corresponding to the image to be tested, and the defect detecting model is generated based on the training of a generative adversarial network and a plurality of normalized loss functions.

Finally, in the step S205, the electronic apparatus compares the anomaly score with an anomaly score threshold to determine whether the image to be tested is a defective image.

In some embodiments, the defect detecting method 200 further comprises following steps: calculating a pixel squared difference between the image to be tested and a reconstructed image corresponding to the image to be tested to generate the anomaly score; wherein the reconstructed image corresponding to the image to be tested is generated by a first encoder and a decoder in the defect detecting model.

In some embodiments, the defect detecting method 200 further comprises following steps: receiving a plurality of sample images; inputting the sample images to a training model constructed by the generative adversarial network; training the training model based on an encoder loss function, a contextual loss function, and an adversarial loss function after normalization; and setting the training model after training as the defect detecting model.

In some embodiments, the encoder loss function after normalization is generated based on a normalized squared difference between a first encoding feature and a second encoding feature, and the first encoding feature is generated by a first encoder in the defect detecting model, and the second encoding feature is generated by a second encoder in the defect detecting model.

In some embodiments, the contextual loss function after normalization is generated based on a absolute value of a normalized pixel difference between the image to be tested and a reconstructed image corresponding to the image to be tested, wherein the reconstructed image corresponding to the image to be tested is generated by a first encoder and a decoder in the defect detecting model.

In some embodiments, the adversarial loss function after normalization is generated based on a normalized feature matching squared difference.

In some embodiments, the image to be tested corresponds to a first color space, and the defect detecting method 200 further comprises following steps: converting the image to be tested to a second color space, wherein the second color space comprises at least one first channel value and a plurality of second channel values; and performing a normalization operation on the at least one first channel value of the image to be tested in the second color space.

In some embodiments, a first range corresponding to the at least one first channel value is different from a second range corresponding to the second channel values.

In some embodiments, the defect detecting method 200 further comprises following steps: receiving a plurality of sample images, wherein the sample images correspond to a first color space; converting the sample images to a second color space, wherein the second color space comprises at least one first channel value and a plurality of second channel values; performing a normalization operation on the at least one first channel value of the sample images in the second color space; inputting the sample images to a training model constructed by the generative adversarial network; training the training model based on an encoder loss function, a contextual loss function, and an adversarial loss function after normalization; and setting the training model after training as the defect detecting model.

In some embodiments, a first range corresponding to the at least one first channel value is different from a second range corresponding to the second channel values.

In addition to the aforesaid steps, the second embodiment can also execute all the operations and steps of the defect detecting apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present invention, some words (e.g., the encoder, the encoding feature, the color space, the channel value, and the range) are preceded by terms such as "first" or "second," and these terms of "first" and "second" are only used to distinguish these different words. For example, the "first" and "second" in the first color space and the second color space are only used to indicate the color space used in different embodiment.

According to the above descriptions, the defect detecting technology (at least comprises the apparatus and the method) provided by the present disclosure detects the image to be tested to generate an anomaly score corresponding to the image to be tested through the defect detecting model trained by a generative adversarial network and a plurality of normalized loss functions. The defect detecting technology determines whether the image to be tested is a defective image by comparing the anomaly score with an anomaly score threshold. In addition, the defect detecting technology provided by the present disclosure improves the training speed and the stability of the defect detecting model through a multi-stage adjustment mechanism (e.g., adjusting the loss function, adjusting the calculation method of the anomaly score, converting the color space and normalizing some of the channels, etc.). Therefore, the defect detecting technology provided by the present disclosure can improve the accuracy of defect detecting, and solve the problem that the defect detection caused by the conventional technology cannot be actually used for some detecting targets due to the low accuracy and high false positive rate.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A defect detecting apparatus, comprising:

a storage, being configured to store a defect detecting model;

a transceiver interface; and a processor, being electrically connected to the storage and the transceiver interface, and being configured to perform operations comprising:

receiving an image to be tested from the transceiver interface;

detecting the image to be tested received from the transceiver interface through the defect detecting model stored in the storage to generate an anomaly score corresponding to the image to be tested, wherein the defect detecting model is generated based on a training of a generative adversarial network and a plurality of normalized loss functions, wherein the anomaly score is generated by calculating a pixel squared difference between the image to be tested and a reconstructed image corresponding to the image to be tested; and comparing the anomaly score with an anomaly score threshold to determine whether the image to be tested is an image depicting a defective object;

wherein the processor is further configured to perform the following operations:

receiving a plurality of sample images;

inputting the sample images to a training model constructed by the generative adversarial network;

training the training model based on an encoder loss function, a contextual loss function, and an adversarial loss function after normalization, wherein the encoder loss function, the contextual loss function, and the adversarial loss function are individually normalized, and a value range of each of the normalized loss functions is constrained between 0 and 1; and setting the training model after training as the defect detecting model.

2. The defect detecting apparatus of claim 1, wherein the reconstructed image corresponding to the image to be tested is generated by a first encoder and a decoder in the defect detecting model.

3. The defect detecting apparatus of claim 1, wherein the encoder loss function after normalization is generated based on a normalized squared difference between a first encoding feature and a second encoding feature, and the first encoding feature is generated by a first encoder in the defect detecting model, and the second encoding feature is generated by a second encoder in the defect detecting model.

4. The defect detecting apparatus of claim 1, wherein the contextual loss function after normalization is generated based on a absolute value of a normalized pixel difference between the image to be tested and the reconstructed image corresponding to the image to be tested, wherein the reconstructed image corresponding to the image to be tested is generated by a first encoder and a decoder in the defect detecting model.

5. The defect detecting apparatus of claim 1, wherein the adversarial loss function after normalization is generated based on a normalized feature matching squared difference.

6. The defect detecting apparatus of claim 1, wherein the image to be tested corresponds to a first color space, and the processor further performs following operations:

converting the image to be tested to a second color space, wherein the second color space comprises at least one first channel value and a plurality of second channel values; and performing a normalization operation on the at least one first channel value of the image to be tested in the second color space.

7. The defect detecting apparatus of claim 6, wherein a first range corresponding to the at least one first channel value is different from a second range corresponding to the second channel values.

8. The defect detecting apparatus of claim 1, wherein the processor further performs the following operations:
 receiving the plurality of sample images, wherein the sample images correspond to a first color space;
 converting the sample images to a second color space, wherein the second color space comprises at least one first channel value and a plurality of second channel values;
 performing a normalization operation on the at least one first channel value of the sample images in the second color space;
 inputting the sample images to the training model constructed by the generative adversarial network;
 training the training model based on the encoder loss function, the contextual loss function, and the adversarial loss function after normalization; and
 setting the training model after training as the defect detecting model.

9. The defect detecting apparatus of claim 8, wherein a first range corresponding to the at least one first channel value is different from a second range corresponding to the second channel values.

10. A defect detecting method, being adapted for use in an electronic apparatus, and comprising following steps:
 receiving an image to be tested;
 detecting the image to be tested through a defect detecting model to generate an anomaly score corresponding to the image to be tested, wherein the defect detecting model is generated based on a training of a generative adversarial network and a plurality of normalized loss functions, wherein the anomaly score is generated by calculating a pixel squared difference between the image to be tested and a reconstructed image corresponding to the image to be tested; and
 comparing the anomaly score with an anomaly score threshold to determine whether the image to be tested is an image depicting a defective object;
 wherein the defect detecting method further comprises the following steps:
 receiving a plurality of sample images;
 inputting the sample images to a training model constructed by the generative adversarial network;
 training the training model based on an encoder loss function, a contextual loss function, and an adversarial loss function after normalization, wherein the encoder loss function, the contextual loss function, and the adversarial loss function are individually normalized, and a value range of each of the normalized loss functions is constrained between 0 and 1; and
 setting the training model after training as the defect detecting model.

11. The defect detecting method of claim 10, wherein the reconstructed image corresponding to the image to be tested is generated by a first encoder and a decoder in the defect detecting model.

12. The defect detecting method of claim 10, wherein the encoder loss function after normalization is generated based on a normalized squared difference between a first encoding feature and a second encoding feature, and the first encoding feature is generated by a first encoder in the defect detecting model, and the second encoding feature is generated by a second encoder in the defect detecting model.

13. The defect detecting method of claim 10, wherein the contextual loss function after normalization is generated based on a absolute value of a normalized pixel difference between the image to be tested and the reconstructed image corresponding to the image to be tested, wherein the reconstructed image corresponding to the image to be tested is generated by a first encoder and a decoder in the defect detecting model.

14. The defect detecting method of claim 10, wherein the adversarial loss function after normalization is generated based on a normalized feature matching squared difference.

15. The defect detecting method of claim 10, wherein the image to be tested corresponds to a first color space, and the defect detecting method further comprises following operations:
 converting the image to be tested to a second color space, wherein the second color space comprises at least one first channel value and a plurality of second channel values; and
 performing a normalization operation on the at least one first channel value of the image to be tested in the second color space.

16. The defect detecting method of claim 15, wherein a first range corresponding to the at least one first channel value is different from a second range corresponding to the second channel values.

17. The defect detecting method of claim 10, further comprising the following steps:
 receiving the plurality of sample images, wherein the sample images correspond to a first color space;
 converting the sample images to a second color space, wherein the second color space comprises at least one first channel value and a plurality of second channel values;
 performing a normalization operation on the at least one first channel value of the sample images in the second color space;
 inputting the sample images to the training model constructed by the generative adversarial network;
 training the training model based on the encoder loss function, the contextual loss function, and the adversarial loss function after normalization; and
 setting the training model after training as the defect detecting model.

18. The defect detecting method of claim 17, wherein a first range corresponding to the at least one first channel value is different from a second range corresponding to the second channel values.

* * * * *